US011228478B1

(12) United States Patent
Neofytou et al.

(10) Patent No.: US 11,228,478 B1
(45) Date of Patent: Jan. 18, 2022

(54) SYSTEMS AND METHODS FOR CALIBRATION OF IN-PHASE/QUADRATURE (I/Q) MODULATORS

(71) Applicant: NXP B.V., Eindhoven (NL)

(72) Inventors: Marios Neofytou, Eindhoven (NL);
Konstantinos Doris, Amsterdam (NL);
Marcello Ganzerli, Eindhoven (NL);
Georgi Ivanov Radulov, Eindhoven (NL); Pavlos Athanasiadis, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/069,669

(22) Filed: Oct. 13, 2020

(51) Int. Cl.
*H04L 5/04* (2006.01)
*H04L 27/36* (2006.01)
*H04L 27/12* (2006.01)
*H04L 5/02* (2006.01)
*H04L 27/26* (2006.01)
*H04L 27/00* (2006.01)

(52) U.S. Cl.
CPC ............ *H04L 27/364* (2013.01); *H04L 5/023* (2013.01); *H04L 27/122* (2013.01); *H04L 27/2626* (2013.01); *H04L 2027/0057* (2013.01)

(58) Field of Classification Search
CPC .................................................... H04L 27/364
See application file for complete search history.

(56) References Cited

U.S. PATENT DOCUMENTS

| | | | | |
|---|---|---|---|---|
| 5,369,411 A * | 11/1994 | Lisle, Jr. | ............... | G01S 7/4021 |
| | | | | 342/194 |
| 8,948,326 B2 * | 2/2015 | Primo | ...................... | H04B 1/30 |
| | | | | 375/346 |
| 9,374,143 B2 * | 6/2016 | Giannakis | ........... | H04L 27/2692 |
| 2002/0015450 A1 * | 2/2002 | Ratto | .................. | H04L 27/2089 |
| | | | | 375/261 |
| 2003/0174783 A1 * | 9/2003 | Rahman | .............. | H04L 27/0014 |
| | | | | 375/298 |

OTHER PUBLICATIONS

Alavi, Morteza S., et al., "A Wideband 2×13-bit All-Digital I/Q RF-DAC", Microwave Theory and Techniques, vol. 62, No. 4, Apr. 2014, 21 pages.
Chen, Jiashu, et al., "A Digitally Modulated mm-Wave Cartesian Beamforming Transmitter with Quadrature Spatial Combining", International Conference on Solid-State Circuits, Feb. 19, 2013, 3 pages.

* cited by examiner

*Primary Examiner* — Qutbuddin Ghulamali

(57) ABSTRACT

A wireless transceiver system includes a transmitter and a receiver. The transmitter includes a digital processor and a self-correction modulator coupled to the digital processor, wherein based upon a calibration correction assessment of an in-phase (I) signal and a quadrature (Q) signal received from the digital processor, the self-correction modulator generates a calibrated modulated signal. The self-correction modulator includes a core modulator and a calibration correction unit. The calibration correction unit is configured to correct an output of the core modulator based upon the calibration correction assessment. The calibration correction unit includes a calibration processing unit and a calibration modulator, wherein the calibration processing unit provides correction quantities that are used to program the calibration modulator to provide the self-corrected modulated signal.

19 Claims, 6 Drawing Sheets

SYSTEMS AND METHODS FOR CALIBRATION OF IN-PHASE/QUADRATURE (I/Q) MODULATORS

BACKGROUND

Wireless transmitters in automotive radar systems often exhibit non-linear distortion that leads to poor bitrate performance in communications or poor radar detection in automotive radars. Automotive radar systems employ advanced universal digital modulation schemes in phase, frequency and amplitude in order to enable true multiple-input-multiple-output (MIMO) capabilities with improved radar performance. The advanced modulation schemes implement digital radar encryption that necessitate extremely linear transmitters consisting of in-phase/quadrature (I/Q) modulators with substantially increased linearity at high frequencies compared to general frequency-modulated continuous-wave (FMCW) radars. As a result, automotive radar systems should provide increased linearity without compromising the capability to generate signal power at millimeter wave frequencies.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate systems and methods for calibrating a wireless transceiver system in order to reduce errors at the output of the wireless transceiver system in accordance with some embodiments. A self-correction modulator in a transmitter of the wireless transceiver system uses both an input signal for an in-phase path (hereinafter, in-phase (I) signal) and an input signal for quadrature-phase path (hereinafter, quadrature (Q) signal) to compensate for signal error introduced by a core in-phase and quadrature (I/Q) modulator of the transmitter. In some embodiments, a calibration correction unit in the self-correction modulator generates a correction current (or a correction voltage or a correction charge equivalent) that includes a correction transconductance (gm) that is applied at the output of the core I/Q modulator to correct the signal error. In some embodiments, a subset of the in-phase signal and the quadrature signal are used to generate an error correction amount or correction data that is used by a calibration I/Q modulation unit to generate the correction current or correction transconductance that is applied at the output of the core I/Q modulator. In some embodiments, a calibration processing unit in the calibration correction unit performs a calibration correction assessment that utilizes a subset of the in-phase signal and the quadrature signal to generate the correction data that is used by the calibration I/Q modulation unit to generate the correction current that is applied at the output of the core I/Q modulator. In some embodiments, the in-phase signal and quadrature signal are in-phase and quadrature-phase digital input data. The calibration I/Q modulation unit injects the correction current at the output of the core modulator to correct the error at the output of the core modulator.

In some embodiments, the calibration I/Q modulation unit includes calibration I/Q mixing digital-to-analog converters (DACs) that are considered scaled versions of the core modulator and provide the inverse of the error at the output of the calibration I/Q modulation unit. In some embodiments, based upon the correction data output by the calibration processing unit, the self-correction modulator improves performance of the wireless transceiver system by generating a modulated signal that is calibrated and limited in the errors output at the transmitter.

Figure 1:
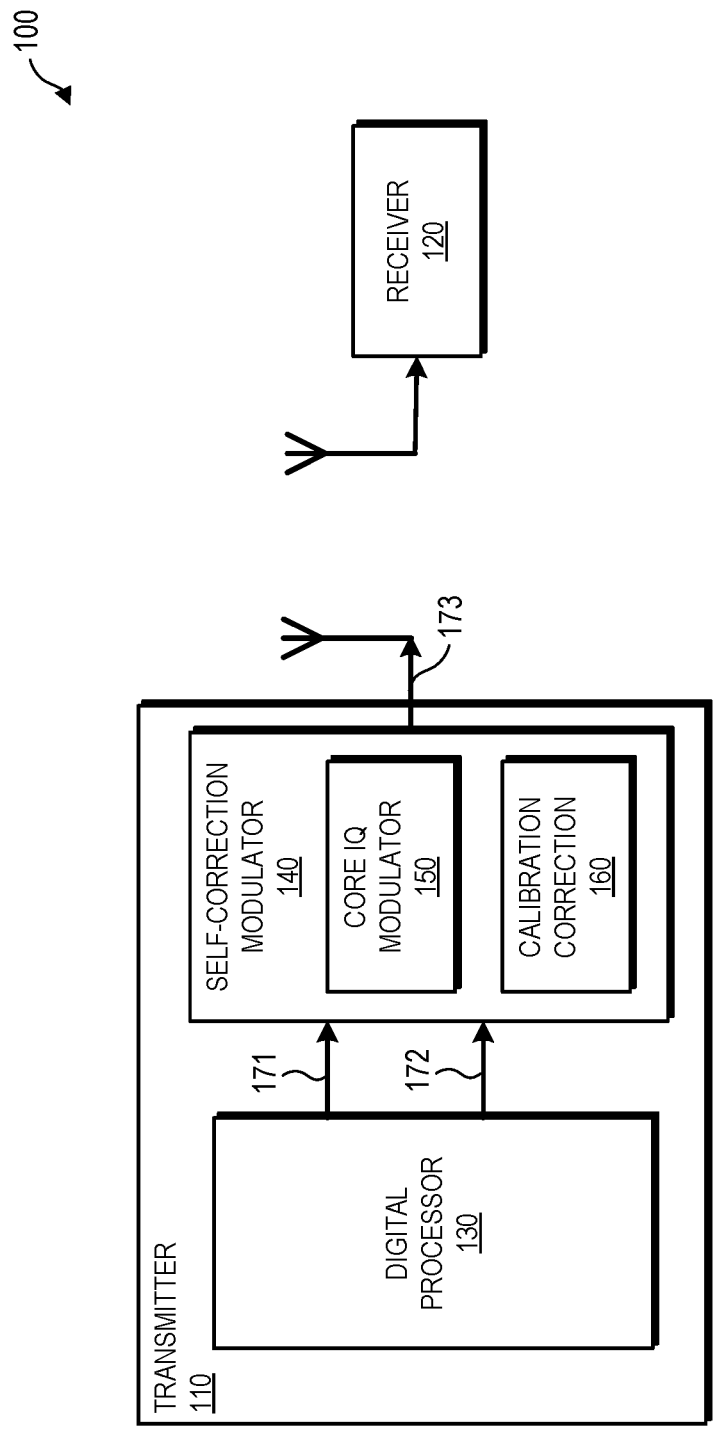
FIG. 1 is a block diagram of a wireless transceiver system in accordance with some embodiments.

FIG. 1 illustrates a wireless transceiver system 100 according to some embodiments. Wireless transceiver system 100 includes a transmitter 110 and a receiver 120. In some embodiments, the wireless transceiver system 100 may be a radar system or a communication system. Transmitter 110 includes a digital processor 130 and a self-correction modulator 140. The self-correction modulator 140 includes a core modulator 150 and a calibration correction unit 160. In some embodiments, self-correction modulator 140 is a self-correction cartesian I/Q modulator that, in addition to modulating a local oscillator (LO) signal according to the digital baseband I and Q information, corrects errors caused during the modulation process.

In operation, to initiate the modulation process, self-correction modulator 140 of transmitter 110 receives an input signal for an in-phase path (hereinafter, in-phase signal 171) and an input signal for a quadrature-phase path (hereinafter, quadrature signal 172) from digital processor 130 and commences the process of converting the digital baseband information into a millimeter-waveform for transmission by transmitter 110. In some embodiments, both the core modulator 150 and the calibration correction unit 160 of self-correction modulator 140 receive the in-phase signal 171 and the quadrature signal 172 for error correction or calibration.

Core modulator 150 receives the in-phase signal 171 and quadrature signal 172 and modulates the signals according to typical I/Q modulation schemes. That is, using a series of digital-to-analog converters (DACs) (depicted in further detail with reference to FIG. 2), the I and Q digital data are converted to analog baseband signals and mixed with the quadrature local oscillator (LO) signal from a local oscillator to implement a frequency up-conversion function of the baseband signal on to the LO carrier frequency. In some embodiments, the core modulator 150 outputs a modulated output signal that includes errors caused by the core modulator 150. In some embodiments, the errors are transconductance ($g_m$) errors that are caused by, for example, the transistors of the core modulator 150.

Calibration correction unit 160 receives the in-phase signal 171 and quadrature signal 172 and commences the process of error correction and calibration. In some embodiments, as stated previously, the errors corrected by calibration correction unit 160 are transconductance ($g_m$) errors that are caused by, for example, the transistors of the core modulator 150. In some embodiments, in order to correct the errors, calibration correction unit 160 is configured to provide a correction current that includes correction transconductance at the output of core modulator 150 that nullifies or cancels out the error caused by the core modulator 150. That is, the calibration correction unit 160 is configured to inject correction current to the output of the core modulator 150 to correct error at the output of the core modulator 150. In some embodiments, calibration correction unit 160 provides the inverse $g_m$ error as the correction transconductance as part of the correction current that is summed with the output of core modulator 150 in order to nullify the error.

As explained further below with reference to FIGS. 2-6, the calibration correction unit 160 generates the correction current or correction transconductance by using a calibration processing unit. In some embodiments, the calibration processing unit outputs a subset of the in-phase signal 171 and the quadrature signal 172 (i.e., correction data) that is mapped to an error correction amount or correction quantities in a calibration look-up table. The correction quantities are used to program a plurality of calibration multiplexing processing units, whose output is provided to a calibration I/Q modulation unit to generate the correction transconductance as part of the correction current that is provided to the core modulator. By providing correction transconductance, which is the inverse of the transconductance errors, as part of the correction current, the calibration correction unit 160 is able to calibrate the self-correction modulator 140 to reduce the errors in the modulated output signal 173 provided at the output of transmitter 110.

Figure 2:
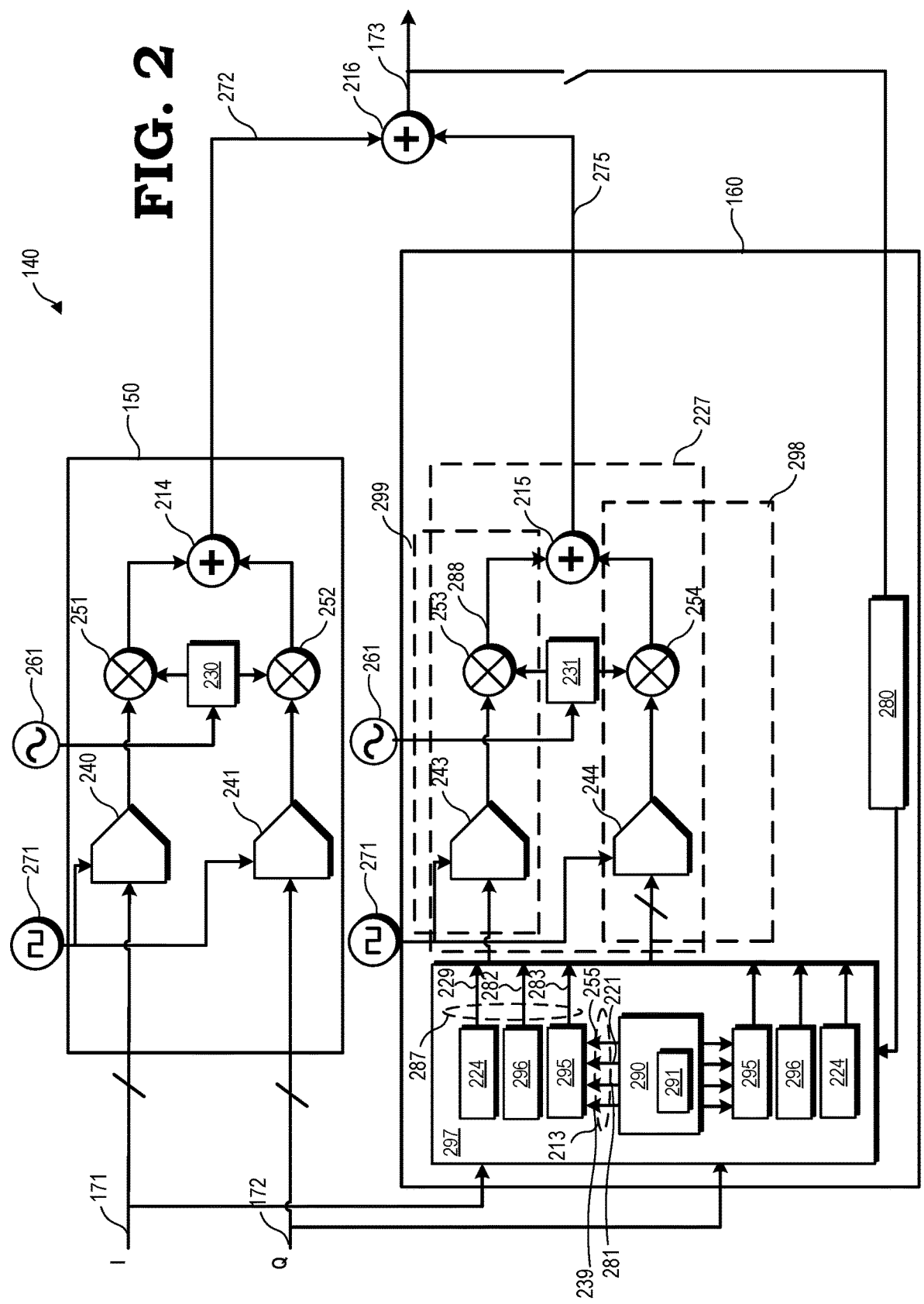
FIG. 2 is a block diagram of a self-correction modulator used in a transmitter of the wireless transceiver of FIG. 1 in accordance with some embodiments.

FIG. 2 is a block diagram of the self-correction modulator 140 used in the wireless transceiver system 100 of FIG. 1 in accordance with some embodiments. The self-correction modulator 140 includes core modulator 150, calibration correction unit 160, a function generator 271, a local oscillator (LO) 261, and summer 216. Summer 216 is coupled to the output of both core modulator 150 and calibration correction unit 160. Core modulator 150 and calibration correction unit 160 are coupled to function generator 271 and local oscillator 261. Core modulator 150 includes a digital-to-analog converter (DAC) 240, a DAC 241, a mixer 251, phase shifter 230, a mixer 252, and a summer 214. DAC 240 is coupled to function generator 271, digital processor 130, and mixer 251. DAC 241 is coupled to function generator 271, digital processor 130, and mixer 252. Mixer 251 is coupled to DAC 240, phase shifter 230, and summer 214. Mixer 252 is coupled to DAC 241, phase shifter 230, and summer 214. phase shifter 230 is coupled to local oscillator 261 and mixer 251 and mixer 252. Summer 214 is coupled to mixer 251, mixer 252, and summer 216.

Calibration correction unit 160 includes a calibration processing unit 297, a calibration I/Q modulation unit 227, and optionally a self-measurement unit 280. Calibration processing unit 297 includes a calibration multiplexing processing unit 295, a calibration multiplexing processing unit 296, a calibration multiplexing processing unit 224, and optionally a digital calibration processing unit 290. Digital calibration processing unit 290 includes a calibration look-up table 291.

Calibration I/Q modulation unit 227 includes a calibration mixing DAC 298 (cal-mix DAC 298), a calibration mixing DAC 299 (cal-mix DAC 299), a phase shifter 231, and a summer 215. Cal-mix DAC 299 includes a DAC 243 and a mixer 253. Cal-mix DAC 298 includes a DAC 244 and a mixer 254. In some embodiments, calibration correction unit 160 includes self-measurement unit 280, which is coupled to digital calibration processing unit 290 and the output of summer 216. Digital calibration processing unit 290 is coupled to digital processor 130, DAC 243, DAC 244, and optionally self-measurement unit 280. DAC 243 is coupled to function generator 271, digital calibration processing unit 290, and mixer 253. DAC 244 is coupled to function generator 271, digital calibration processing unit 290, and mixer 254. Mixer 253 is coupled to DAC 244, phase shifter 231, and summer 215. Mixer 254 is coupled to DAC 244, phase shifter 231, and summer 215. phase shifter 231 is coupled to local oscillator 261 and mixer 253 and mixer 254. Summer 215 is coupled to mixer 253, mixer 254, and summer 216. In some embodiments, DAC 243, DAC 244, mixer 253, mixer 254, and summer 215, may be considered more generally, as an actuator portion that implements the calibration or error correction conducted by calibration correction unit 160.

In operation, DAC 240 and DAC 241 of core modulator 150 receive in-phase signal 171 and quadrature signal 172 and, along with mixer 251, mixer 252, phase shifter 230, and summer 214, modulate the in-phase signal 171 and quadrature signal 172 according to typical I/Q modulation schemes. That is, using DAC 240 and DAC 241, in-phase signal 171 and quadrature signal 172 (e.g., the I and Q digital data or in-phase and quadrature-phase digital input data, 171 and 172 respectively) are converted to analog baseband signals and mixed with the quadrature local oscillator (LO) signal from local oscillator 261 to implement a frequency up-conversion function of the baseband signal on to the LO carrier frequency. The core modulator 150 outputs a modulated output signal that includes errors caused by the core modulator 150. In some embodiments, the errors are transconductance ($g_m$) errors that are caused by, for example, the transistors of the core modulator 150.

As stated previously, the modulation process performed by the core modulator 150 introduces errors, such as, for example, transconductance ($g_m$) errors, that are caused by the transistors of the core modulator 150. Further, in some embodiments, the errors introduced by core modulator 150 are input signal dependent and lead to a distorted modulated output signal. Examples of such errors include DAC non-linearity in the transfer function, DAC timing errors, etc.

In some embodiments, where a single signal path affects the operation of the other signal path, errors in I and Q output signal components depend on both I and Q. In this case, in each branch the I and Q signal components have errors that depend on both the I and Q input signals which are called two-dimensional errors. Examples include non-linear distortion generated at the common output node, and transconductance modulation of the transistors making up, for example, the mixer and summation portions of core modulator 150. In some embodiments, the errors may be classified as "bending errors" (i.e., second order errors) or "compressed errors" (i.e., third order errors). The bending errors are called "bending errors" because when evaluating a constellation diagram that represents the received signals, the errors appear to bend the received signals. Similarly, the compressed errors are called "compressed errors" because when evaluating a constellation diagram that represents the received signals, the received signals appear to be compressed. Self-correction modulator 140 is configured to compensate for these errors.

In some embodiments, in order to compensate for the signal errors introduced by, for example, the core modulator 150, self-correction modulator 140 includes a two-dimensional correction path that utilizes calibration correction unit 160 to inject correction current 275 that includes correction transconductance at the output of the core modulator 150.

In some embodiments, the digital calibration processing unit 290 of calibration processing unit 297 receives both in-phase signal 171 and quadrature signal 172 from digital processor 130 and conducts a calibration correction assessment of the in-phase signal 171 and quadrature signal 172 in order to determine correction data 287 (or correction quantities 287) that are to be output be digital calibration processing unit 290 to generate the correction current 275. That is, the digital calibration processing unit 290 determines a subset of bits (subset content 213) of the in-phase signal 171 and quadrature signal 172 that map to the correction data 287 in calibration look-up table 291. The correction data 287 is used by calibration I/Q modulation unit 227 to generate the correction current 275 or correction transconductance associated with the correction current 275 that is applied at the output of core modulator 150 by calibration I/Q modulation unit 227.

In some embodiments, in order to generate the correction data 287, digital calibration processing unit 290 provides the subset of bits (subset content 213) of in-phase signal 171 and quadrature signal 172 to calibration multiplexing processing unit 295, calibration multiplexing processing unit 296, and/or calibration multiplexing processing unit 224. In some embodiments, using predefined multiplexer configurations that are mapped to the subset content 213, calibration multiplexing processing unit 295, calibration multiplexing processing unit 296, and/or calibration multiplexing processing unit 224 generate the correction data 287 that is provided to the calibration I/Q modulation unit 227 such that the transfer function of the calibrated modulated output signal 173 is linear.

In some embodiments, the digital calibration processing unit 290 determines subset content 213 of the in-phase signal 171 and quadrature signal 172 that map to the correction quantities 287 that are to be used to generate the correction current 275 applied at summer 216 based on, for example, a-priori, a-posteriori information with respect to the design and/or testing of the wireless transceiver system 100, or a combination of both. In some embodiments, the a-priori and/or a-posteriori information is mapped to a calibration look-up table 291 and a constellation diagram indicative of the ideal values of the received signals (in-phase signal 171 and quadrature signal 172) that, after being modulated, are provided at the output of the self-correction modulator 140. In some embodiments, the mapping of the a-priori and/or a-posteriori information to the calibration look-up table 291 is generated empirically by testing software or an engineer during, for example, design and testing of the wireless transceiver system 100. In some embodiments, a hardcoded or soft-coded calibration look-up table 291, for example, implemented during chip design is a typical example of a-priori information. In some embodiments, a-posteriori error information is acquired using the self-measurement unit 280 during, for example, run time operation or generally after fabrication of the wireless transceiver system 100. That is, in some embodiments, self-measurement unit 280 is configured to acquire a-posteriori error information during run time operations. In some embodiments, the self-measurement unit 280 is configured to update the calibration look-up table 291 with updated correction quantities that map to the transistors of core modulator 150 that are used for modulation.

In some embodiments, calibration correction unit 160 is configured to utilize the calibration I/Q modulation unit 227 for binary coded and thermometer (unary) coded applications. That is, in some embodiments, for thermometer applications, digital calibration processing unit 290 is configured to determine the bits (e.g., subset content 213) of the received signals 171 and 172 (e.g., the most significant bits (MSBs), etc.) that are used to generate the correction data 287. In some embodiments, for binary coded applications, digital calibration processing unit 290 is not required to determine the bits (subset content 213) of the received signals 171 and 172 (e.g., the most significant bits (MSBs), etc.) and calibration correction unit 160 is hardwired to access the bits that map to the correction data 287. In some embodiments, thermometer, binary, or a combination of both thermometer and binary applications may be implemented by self-correction modulator 140. In some embodiments, a binary-to-thermometer decoder (not shown) may be used to convert binary to thermometer form, where the mixing-DACs are configured to implement the thermometer applications. In the case the mixing-DAC is fully binary, additional driver/buffers may be implemented to store the binary data.

In some embodiments, for example, in order to conduct the calibration correction assessment, digital calibration processing unit 290 is configured to receive a codeword represented by the in-phase signal 171 and quadrature signal 172 and determine a subset of codeword (subset content 213) that maps to a predefined position or positions of the codeword. In some embodiments, the predefined positions of the codeword correspond to a first position of the quadrature signal 172, a second position of quadrature signal 172, a first position of the in-phase signal 171, and a second position of the in-phase signal 171. In some embodiments, additional positions of the input in-phase signal 171 and quadrature signal 172 may be used to represent the subset content 213. In some embodiments, the bits that represent the first position of the quadrature signal 172, the second position of quadrature signal 172, the first position of the in-phase signal 171, and the second position of the in-phase signal 171 are output from digital calibration processing unit 290 as subset signal 281, subset signal 239, subset signal 221, and subset signal 255, respectively. Subset signal 281, subset signal 239, subset signal 221, and subset signal 255 are input into at least one of calibration multiplexing processing unit 295, calibration multiplexing processing unit 296, and/or calibration multiplexing processing unit 224 (described further in detail below with reference to FIGS. 3-6) to generate the correction data 287.

In some embodiments, for example, the predefined positions of the codeword correspond to the first position of the quadrature signal 172 represented as, e.g., Q<0> (i.e., most significant bit (MSB)), the second position of the quadrature signal 172 represented as, e.g., Q<1>, the first position of the in-phase signal 171 represented as, e.g., I<0>, and the second position of in-phase signal 171 represented as, e.g., I<1>. The digital calibration processing unit 290 ascertains the subset content 213, e.g., the bits that correspond to the correction quantities 287 which are mapped to calibration look-up table 291, and provides subset content 213 to calibration multiplexing processing unit 295, calibration multiplexing processing unit 296, and/or calibration multiplexing processing unit 224. In some embodiments, since the subset content 213 is mapped to specific correction quantities in the calibration look-up table 291, when the bits that correspond to the subsets are input by the calibration processing unit 290 into calibration multiplexing processing unit 295, calibration multiplexing processing unit 296, and/or calibration multiplexing processing unit 224, calibration multiplexing processing unit 295, calibration multiplexing processing unit 296, and/or calibration multiplexing processing unit 224 provide the requisite correction quantities 287 to the calibration mixing DAC 299 and calibration mixing DAC 298 of calibration I/Q modulation unit 227. That is, the correction quantities 287 output by calibration multiplexing processing unit 295, calibration multiplexing processing unit 296, and/or calibration multiplexing processing unit 224 that correspond to the subset content 213 ascertained during the calibration correction assessment are used calibration I/Q modulation unit 227 to generate the correction current 275.

In some embodiments, as stated previously, for binary coded applications, the subset values (subset content 213) are provided directly to calibration multiplexing processing unit 295, calibration multiplexing processing unit 296, calibration multiplexing processing unit 295 or a combination of each from digital processor 130, bypassing the use of digital calibration processing unit 290 the subset content 213.

Thus, for both binary coded and thermometer coded applications, the subset content 213 that is mapped to the correction quantity 287 is used to program calibration multiplexing processing unit 295, calibration multiplexing processing unit 296, calibration multiplexing processing unit 224, and calibration I/Q modulation unit 227 to generate the correction current 275 that is provided at the output of the calibration correction unit 160. That is, calibration processing unit 297 then utilizes calibration multiplexing processing unit 295, calibration multiplexing processing unit 296, calibration multiplexing processing unit 224, and calibration mixing DAC 299 and calibration mixing DAC 299 of calibration I/Q modulation unit 227 to generate the correction current 275 associated with the correction quantity. Thus, digital calibration processing unit 290 of calibration processing unit 297 programs the multiplexers of calibration multiplexing processing unit 295, calibration multiplexing processing unit 296, calibration multiplexing processing unit 224 or a combination of each (described further with reference to FIGS. 3-6), to provide the input to DAC 243 and DAC 244 of calibration mixing DAC 299 and calibration mixing DAC 298 to generate the correction current 275. The correction current 275 is added to the current output 272 of core modulator 150 to generate the calibrated modulated output signal 173 for transmission by transmitter 110 of FIG. 1.

Figure 3:
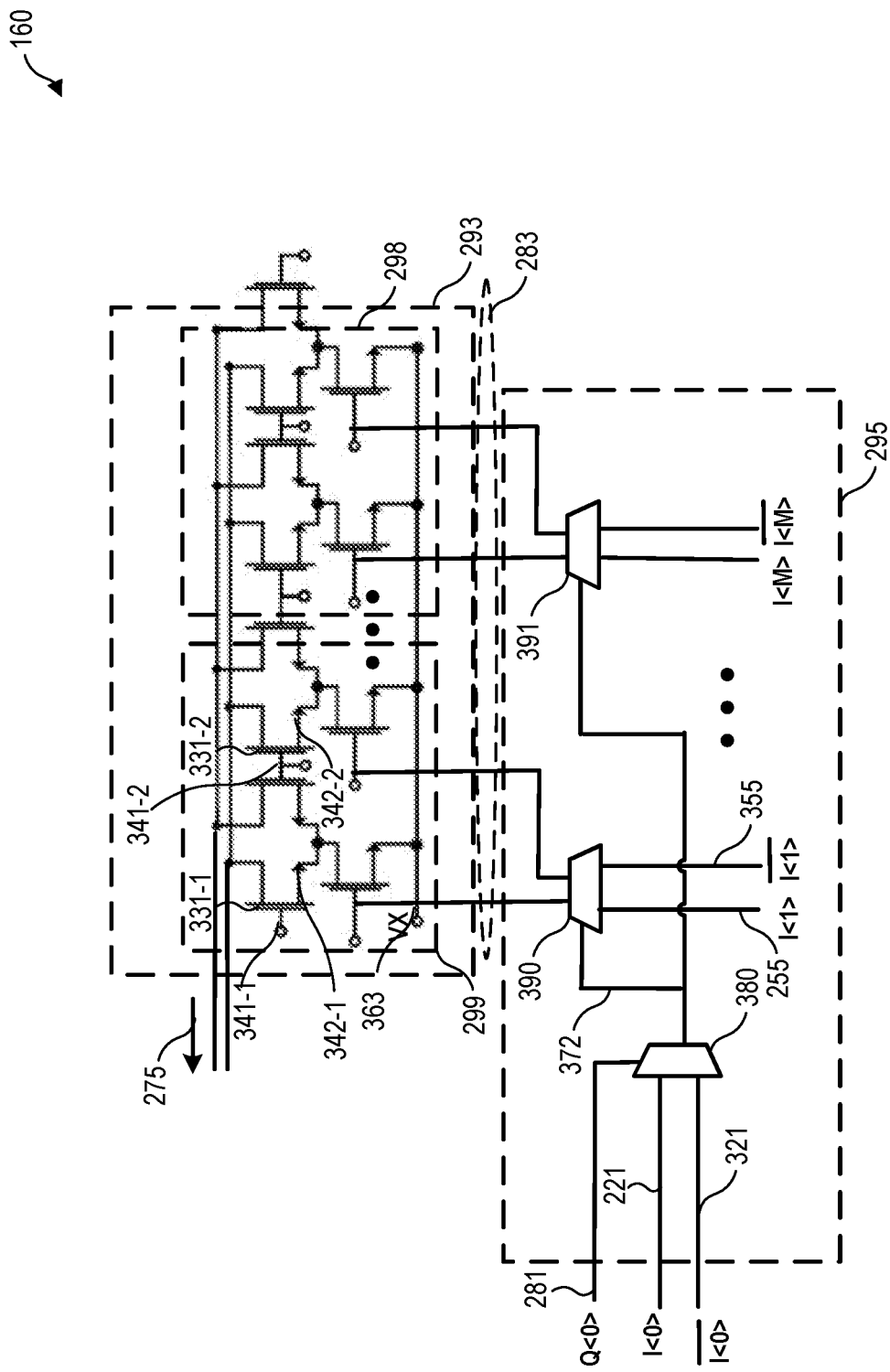
FIG. 3 is a block diagram of a calibration correction unit used in the self-correction modulator of FIG. 2 in accordance with some embodiments.

FIG. 3 is a block diagram of calibration correction unit 160 of self-correction modulator of FIG. 1 in accordance with some embodiments. Calibration correction unit 160 includes calibration I/Q modulation unit 227 and calibration multiplexing processing unit 295. Calibration multiplexing processing unit 295 includes a multiplexer (MUX) 380, a MUX 390, and a MUX 391. In some embodiments, calibration multiplexing processing unit 295 may include M number of multiplexers 390 and 391. Calibration multiplexing processing unit 295 may optionally include an inverter or inverters that are used to invert subset content signals of subset content 213 output from digital calibration processing unit 290 or digital processor 130. MUX 380 is a two-input to one-output multiplexer whose output is equal to a first input when the control input signal is logic level high and a second input when the control input is not a high logic level. MUX 380 is configured to provide the control signal 372 to the control input of MUX 390 and MUX 391. In some embodiments, the control signal 372 dictates the amount of correction current 275 to add to the output of core modulator 150 using calibration I/Q modulator 293. In some embodiments, the transistors of calibration I/Q modulator 293 are coupled to potential Vx at node 363. MUX 390 and MUX 391 are configured to control the transistors of calibration I/Q modulator 293 that provide the correction current to the output of the core modulator 150 (at summer 216).

In operation, in order to generate the correction current 275 at the output of calibration I/Q modulation unit 227, MUX 380 receives subset signal 281 (represented as Q<0> and indicative of the most significant bit (MSB) of quadrature signal 172), at the control input to MUX 380, which defines the sign of compensation depending on the MSB. The first input of MUX 380 receives subset signal 221 (which is the MSB of in-phase signal 171 and represented as I<0>) and the second input of MUX 380 receives subset signal 321 (which is the inverted MSB of in-phase signal 171 and represented as inverted I<0>). In some embodiments, when the value of the control input subset signal 281 that is input to MUX 380 is a logic level high, MUX 380 outputs the first input value of MUX 380, which is subset signal 221 (the MSB of in-phase signal 171 represented as I<0>). In some embodiments, when the control input value to MUX 380 is not a logic level high, MUX 380 outputs the second input value of MUX 380, which is the subset signal 321 (the inverted MSB of in-phase signal 171). In some embodiments, the input values to the multiplexers are not static such that, e.g., the MSB value is changing over time depending on the information to be transmitted. The output of MUX 380 is provided as control signal 372 to MUX 390 and MUX 391.

In some embodiments, MUX 390 and MUX 391 receive the control signal 372 output of MUX 380 that is used by MUX 390 and MUX 391 to control current output by the transistors of cal-mix DAC 299 and cal-mix DAC 298 of calibration I/Q modulation unit 227. In some embodiments, MUX 390 receives a first input subset signal 255, i.e., the in-phase signal 171 (I<1>), and the subset signal 355 (the inverted in-phase signal 171I<1>) as a second input signal. In embodiments where there are a plurality of multiplexers, MUX 391 receives a first input signal, i.e., the in-phase signal 171 bit (I<M>), and the inverted in-phase signal 171(I<M>) as a second input signal.

In some embodiments, when the control signal output of MUX 380 is a logic level high (e.g., a logic level of 1), the outputs of MUX 390 and MUX 391 are equal to the first subset signal 255. That is, the first output and the second output of MUX 390 are equal to the first input subset signal 255. Similarly, when the control signal output of MUX 380 is a logic level high, the first output and the second output of MUX 391 are equal to the first input subset signal of MUX 391.

In some embodiments, when the control signal output of MUX 380 is not a logic level high, the outputs of MUX 390 are equal to the second input subset signal 355 (the inverse of the input subset signal 255). That is, the first output and the second output of MUX 390 are equal to the inverse of first input subset signal 255 (i.e., subset signal 355). Since the control signal 372 output by the MUX 380 is the MSB of the I path (either I<0> or the inverse of I<0>, i.e., the positive or the negative value) and the MSB signal defines the polarity, the overall function implemented is an absolute function.

In some embodiments, MUX 390 and MUX 391 receive the output of MUX 380 at the control inputs and implement the absolute function of I data values received at the inputs of MUX 390 and MUX 391. In some embodiments, the multiplexers (MUX 390 and MUX 391) are an array of (1:M) multiplexers that implement the absolute function of the I data values, where M defines the resolution of the compensation and is less than or equal to N (the number of bits of the core I/Q modulator). In some embodiments, when M is equal to N, for every constellation point mapped to the calibration look-up table 291, there is a unique correction quantity. In some embodiments, when M is less than N, then a subset of constellation points have the same correction quantity. By implementing the absolute function of the I data values received at the inputs of MUX 390 and MUX 391, the multiplexers (e.g., MUX 390 and MUX 391) are configured to generate, for example, a piecewise linear approximation of a quadratic function that is used to generate the correction current 275 at the output of calibration I/Q modulation unit 227.

Figure 4:
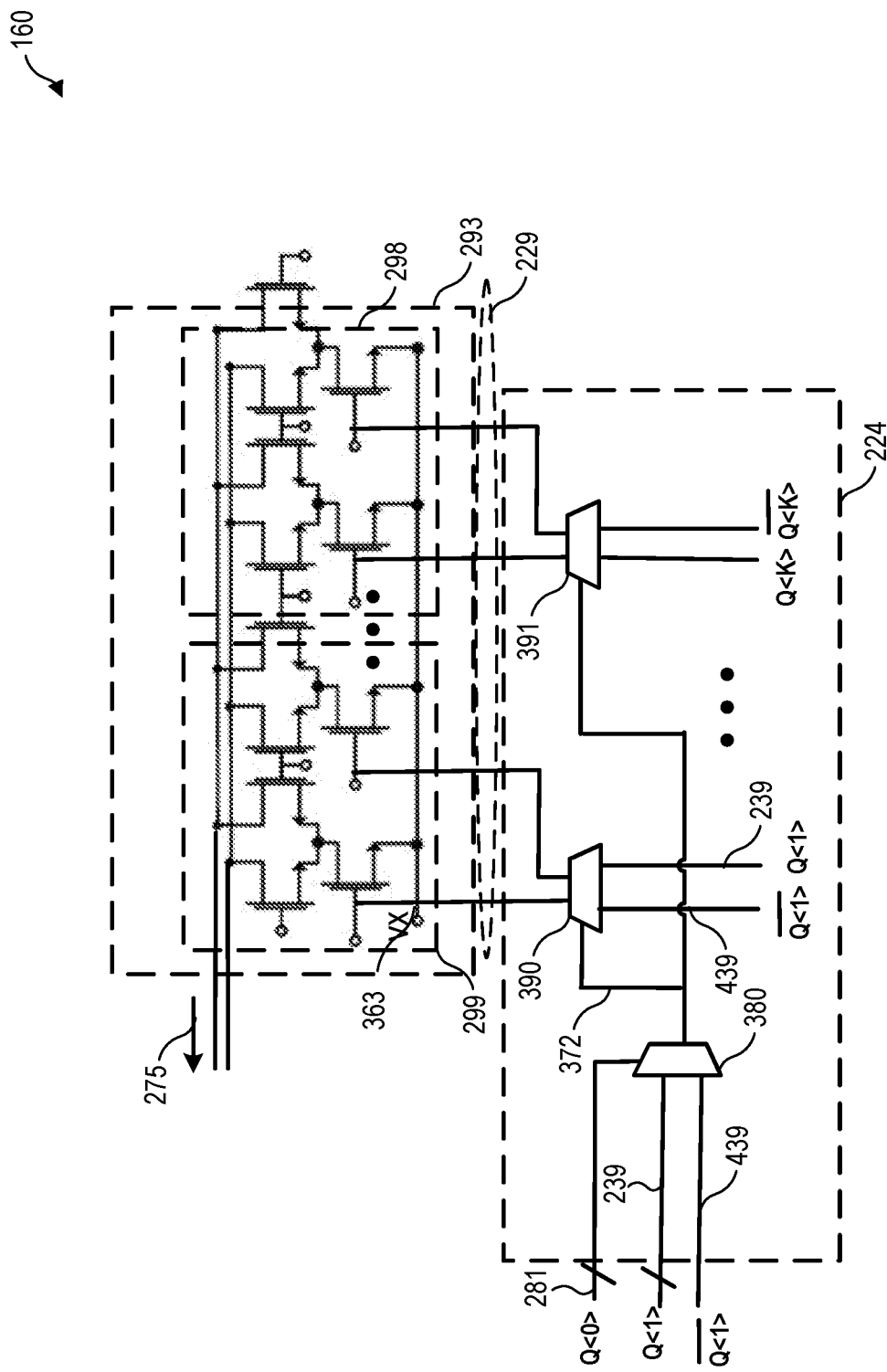
FIG. 4 is a block diagram of a calibration correction unit used in the self-correction modulator of FIG. 2 in accordance with some embodiments.

FIG. 4 is a block diagram of calibration correction unit 160 of self-correction modulator of FIG. 1 in accordance with some embodiments. The calibration correction unit 160 includes calibration multiplexing processing unit 224, which includes a multiplexer configuration similar to that of calibration multiplexing processing unit 295. That is, calibration multiplexing processing unit 224 includes MUX 380, MUX 390, and MUX 391 that operate similar to the MUX 380, MUX 390, and MUX 391 in FIG. 3.

However, in some embodiments, the input signals to MUX 380, MUX 390, and MUX 391 are mapped to correction quantities 229 for one-dimensional applications. That is, the input signals to MUX 380, MUX 390, and MUX 391 all correspond subset input signals of only the Q signal.

In operation, in order to generate the correction current 275 at the output of calibration I/Q modulation unit 227 utilizing calibration multiplexing processing unit 224, MUX 380 receives subset signal 281 (represented as Q<0> and indicative of the most significant bit (MSB) of Quadrature signal 172) at the control input to MUX 380. The first input of MUX 380 receives subset signal 239 (represented as Q<1>) and the second input of MUX 380 receives subset signal 439 (which is the inverted Q<1>). In some embodiments, when the value of the control input subset signal 281 that is input into MUX 380 is a logic level high, MUX 380 outputs the first input value of MUX 380, which is subset signal 239 (represented as Q<1>). When the control input value to MUX 380 is not a logic level high, MUX 380 outputs the second input value of MUX 380, which is the subset signal 439 (the inverted Q<1>). The output of MUX 380 is provided as control signal 372 to MUX 390 and MUX 391.

As stated previously, MUX 390 and MUX 391 receive the control signal 372 output of MUX 380 that is used by MUX 390 and MUX 391 to control the transistors of calibration I/Q modulation unit 227. In some embodiments, MUX 390 receives a first input subset signal 239 (Q<1>), and the subset signal 439 (the inverse of subset signal 239 (inverted Q<1>) as a second input signal. In some embodiments, where there are a plurality of multiplexers, MUX 391 receives a first input signal (Q<K>), and the inverted Q<K> as a second input signal.

In some embodiments, when the control signal output of MUX 380 is a logic level high (e.g., a logic level of 1), the outputs of MUX 390 and MUX 391 are equal to the first subset signal 239. That is, the first output and the second output of MUX 390 are equal to the first input subset signal 239. Similarly, when the control signal output of MUX 380 is a logic level high, the first output and the second output of MUX 391 are equal to the first input subset signal of MUX 391.

In some embodiments, when the control signal output of MUX 380 is not a logic level high, the outputs of MUX 390 are equal to the second input subset signal 439 (the inverse of the input subset signal 239). That is, the first output and the second output of MUX 390 are equal to the inverse of first input subset signal 239 (i.e., subset signal 439). In some embodiments, the control signal 372 that is output by MUX 380 and provided to MUX 390 and MUX 391 is used to control the correction current 275 that is output by the transistors of cal-mix DAC 299 and cal-mix DAC 298 of calibration I/Q modulation unit 227.

Figure 5:
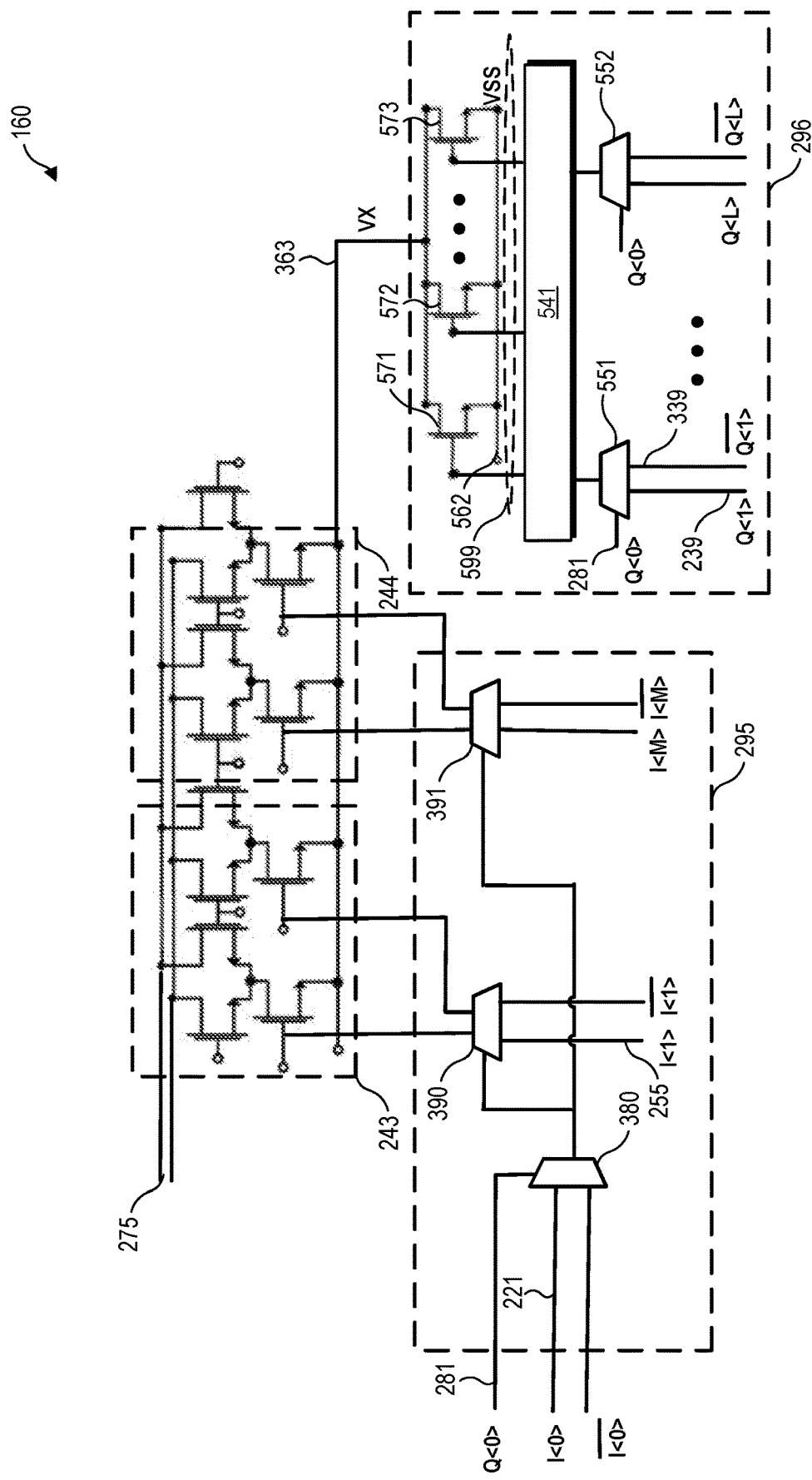
FIG. 5 is a block diagram of a calibration correction unit used in the self-correction modulator of FIG. 2 in accordance with some embodiments.

FIG. 5 is a block diagram of calibration correction unit 160 used in the self-correction modulator of FIG. 1 in accordance with some embodiments. In addition to calibration I/Q modulation unit 227 and calibration multiplexing processing unit 295 that operate as depicted in FIG. 3, calibration correction unit 160 includes calibration multiplexing processing unit 296 that, in addition to adjusting the compensation magnitude of the correction current 275 provided at the output of calibration I/Q modulation unit 227, is configured to address the constellation bending caused by the core modulator 150. Constellation bending is error that is due to the circuit interaction between I and Q paths (such as common impedance coupling at the output common summing node) when, for example, the input Q signal is constant and the input I signal is swept such that a change in the state of the I path causes an additional error in the Q output component. Calibration multiplexing processing unit 296 includes a MUX 551, a MUX 552, an L-to-S binary decoder 541, a transistor 571, a transistor 572, and a transistor 573. In some embodiments, transistor 571, transistor 572, and transistor 573 are coupled to low potential or ground Vss at node 562 and VX at node 363. MUX 551 and MUX 552 are both two-input-to-one-output multiplexers whose output is equal to a first input when the control input signal is high, otherwise the output is equal to a second input. L-to-S binary decoder 541 is a standard digital block that has L inputs and maximally 2^L outputs, where S is less than or equal to 2^L. Similar to M in the embodiment depicted in FIG. 3, L defines the resolution of the compensation magnitude scaling where L is less than or equal to N.

In operation, MUX 551 receives subset signal 281 (i.e., the most significant bit (MSB) of quadrature signal 172) at the control input to MUX 551, which is represented as Q<0>. The first input of MUX 551 receives subset signal 239 (Q<1> of quadrature signal 172) and the second input of MUX 551 receives the inverted subset signal 239 (subset signal 439). In some embodiments, when the control input value to MUX 551 is a logic level high, MUX 551 outputs the first input value of MUX 551, which is subset signal 239 (Q<1>). In some embodiments, when the control input value to MUX 551 is not a logic level high, MUX 551 outputs the second input value of MUX 551, which is subset signal 439 (the inverted Q<1> of quadrature signal 172). The output of MUX 551 is provided as input to L-to-S binary decoder 541. Similarly, MUX 552 receives subset signal 281 (the MSB of quadrature signal 172) at the control input to MUX 552, which is represented as Q<0>. The first input of MUX 552 receives the Q<L> of quadrature signal 172 and the second input of MUX 551 receives the inverted Q<L> of quadrature signal 172. Similar to MUX 551, when the control input value to MUX 552 is logic level high, MUX 552 outputs the first input value of MUX 552, which is Q<L> of quadrature signal 172. When the control input value to MUX 552 is not logic level high, MUX 552 outputs the second input value of MUX 552, which is the inverted Q<L> of quadrature signal 172. The output of MUX 551 and MUX 552 are provided as input to L-to-S binary decoder 541.

In some embodiments, L-to-S binary decoder 541 receives, as input, the output of MUX 551 and MUX 552 and converts the output of MUX 551 and the output of MUX 552 from the L-coded inputs to a maximum of S outputs (output 599). That is, L-to-S binary decoder 541 is configured to decode the output of MUX 551 and MUX 552. L-to-S binary decoder 541 provides the S outputs to the input of transistor 571 and transistor 572. Transistor 571 and transistor 572 (which are considered degeneration transistors) use the S outputs to adjust the compensation magnitude of the correction current 275 provided at the output of calibration I/Q modulation unit 227.

Figure 6:
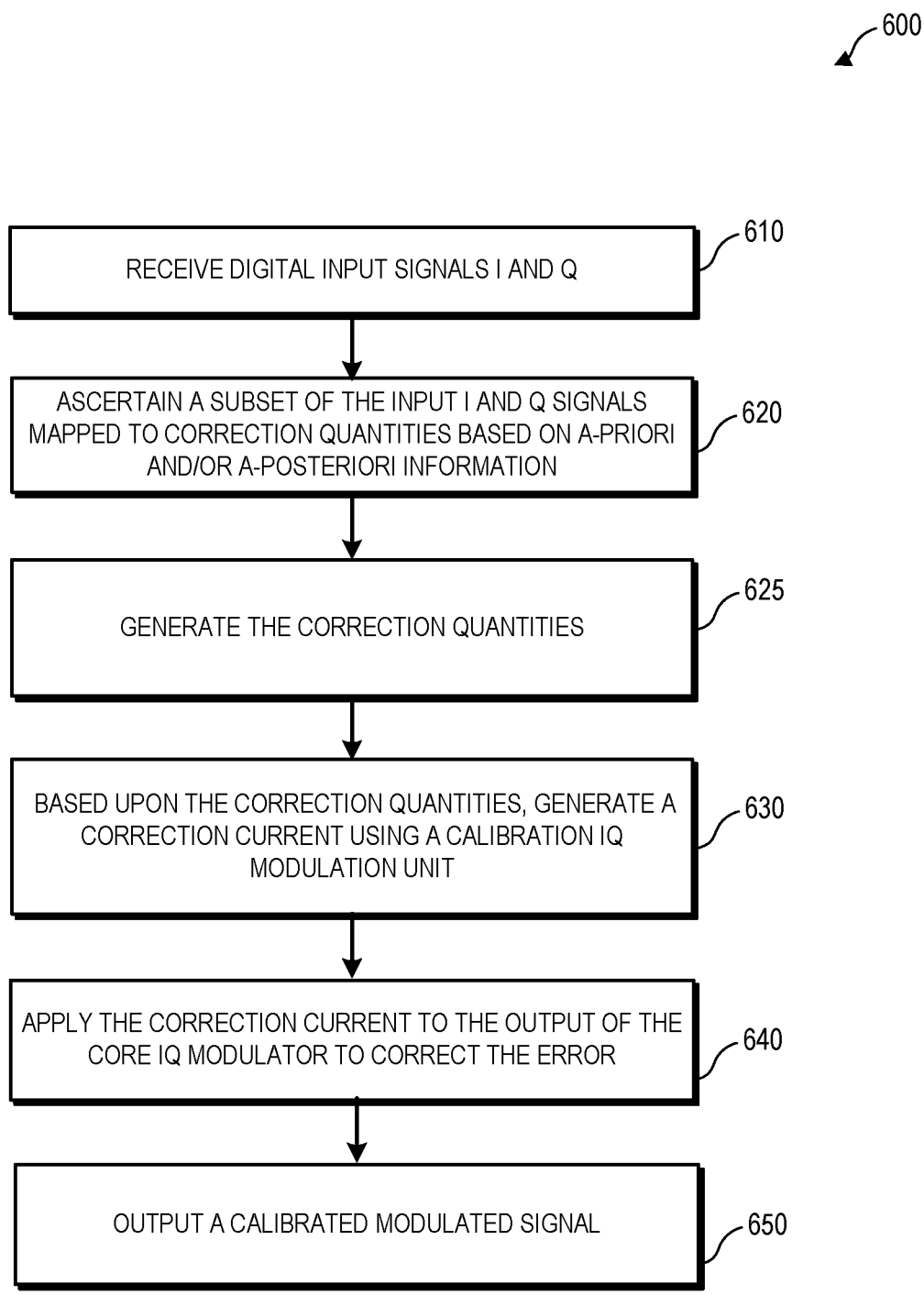
FIG. 6 is a flow diagram illustrating an example method of calibration using the calibration correction unit used in the self-correction modulator of FIG. 2 in accordance with some embodiments.

FIG. 6 is a flow diagram illustrating an example method 600 of calibration using the calibration correction unit used in the self-correction modulator of FIGS. 1-4 in accordance with some embodiments. In some embodiments, method 500 commences at block 610. At block 610, calibration correction unit 160 of self-correction modulator 140 receives in-phase signal 171 and quadrature signal 172 from digital processor 130. At block 620, calibration processing unit 297 of calibration correction unit 160 ascertains a subset of the in-phase signal 171 and quadrature signal 172 (e.g., subset content 213) that are mapped to correction quantities in a calibration look-up table 291. In some embodiments, calibration correction unit 160 performs a calibration correction assessment to ascertain a subset of the in-phase signal 171 and quadrature signal 172 that are used to generate correction quantities. In some embodiments, the calibration look-up table 291 represents a-priori and/or a-posteriori correction quantities that are mapped to the subset values and corresponding correction currents. At block 625, calibration multiplexing processing unit 295, calibration multiplexing processing unit 296, and/or calibration multiplexing processing unit 224 of calibration processing unit 297 generate the correction data 287 using the subset content 213. At block 630, based upon the correction data 287, a correction current is generated using at least a first calibration multiplexing processing unit (e.g., calibration multiplexing processing unit 295 and/or calibration multiplexing processing unit 296). In some embodiments, a correction voltage or correction charge may be generated using a multiplexing processing unit. At block 640, the correction current 275 is applied to the output of core modulator 150 to correct and calibrate the modulated current output 272 of the core modulator 150. In some embodiments, correction voltage or correction charge or may be added or applied to the output of the core modulator 150. At block 650, the corrected modulated output signal 173 is transmitted by transmitter 110 to receiver 120 of the wireless transceiver system 100.

In some embodiments, with reference to FIGS. 2-6, the current output 272 of the core modulator 150 is represented as the summation of the Q path output current ($I_{OUT,Q}$) and the I path output current ($I_{OUT,I}$), which can further be represented in terms of linear output current ($I_{OUT,linear}[Q_{IN}, I_{IN}]$) and output current error ($I_{OUT,error}[Q_{IN}]$), i.e., $$I_{OUT}[Q_{IN},I_{IN}]=I_{OUT,I}[I_{IN}]+I_{OUT,Q}[Q_{IN}]=I_{OUT,linear}[Q_{IN},I_{IN}]+I_{OUT,error}[Q_{IN},I_{IN}]$$

where, for the Q path, the output current in terms of transconductance $g_{m,Q}$ and transconductance error $g_{m,Q,error}$ is $$I_{OUT,Q} = (g_{m,Q} + g_{m,Q,error}[Q_{IN}, I_{IN}]) \times LO_Q \times \frac{(2Q_{IN} - 2^N)}{2^N}$$

where m stands for mutual, $Q_{IN}$ and $I_{IN}$, are the quadrature-phase and in-phase decimal representation of the input signals (e.g. if number of bits (N) is 6, $Q_{IN}$ and $I_{IN}$ are defined in the domain: [0, $2^6$]), $LO_Q$ is the gate-source voltage at, for example, the nodes 341 and 342, respectively, of the transistors 331 of calibration I/Q modulator 293 driven by the signals in the Q path and, N is the number of bits which along with the coding fashion (thermometer or binary) defines the number of cells used in the core I/Q modulator (150 in FIG. 2)

In this case, $g_{m,Q,error}$ is the transconductance error associated with the Q path such that $$g_{m,Q,error}[Q_{IN},I_{IN}]=g_{m,Q,2-D,error}[Q_{IN},I_{IN}]+g_{m,Q,1-D,error}[Q_{IN}]$$

where D stands for dimensional and where a $g_{m,Q,1-D,error}$ is the 1-D error of the Q path and a $g_{m,Q,2-D,error}$ is the 2-D error of the Q path.

Similarly, for the I-path the output current is $$I_{OUT,I} = (g_{m,I} + g_{m,I,error}) \times LO_I \times \frac{(2I_{IN} - 2^N)}{2^N}$$

where m stands for mutual, $Q_{IN}$ and $I_{IN}$, are the quadrature-phase and in-phase decimal representation of the input signals (e.g. if number of bits (N) is 6, $Q_{IN}$ and $I_{IN}$ are defined in the domain: [0, $2^6$]), $LO_I$ is the gate-source voltage at, for example, the nodes 341 and 342, respectively, of the transistors 331 of calibration I/Q modulator 293 driven by the signals in the I path and N is the number of bits which along with the coding fashion (thermometer or binary) defines the number of cells used in the core mixing-DAC (e.g., 150 in FIG. 2)

In this case, $g_{m,I,error}[I_{IN}, Q_{IN}]$ is the transconductance error associated with the I path such that $$g_{m,I,error}[I_{IN},Q_{IN}]=g_{m,I,2-D,error}[I_{IN},Q_{IN}]+g_{m,I,1-D,error}[Q_{IN}]$$

where $g_{m,I,1-D,error}$ is the 1-D error of the I path and $g_{m,I,2-D,error}$ is the 2-D error of the I path.

The total linear output current $I_{OUT,linear}[Q_{IN}, I_{IN}]$ may be written as $$I_{OUT,linear}[Q_{IN}, I_{IN}] = g_{m,Q} \times LO_Q \times \frac{(2Q_{IN} - 2^N)}{2^N} + g_{m,I} \times LO_I \times \frac{(2I_{IN} - 2^N)}{2^N}$$

and the total output error current is $$I_{OUT,error}[Q_{IN}, I_{IN}] = g_{m,Q,error}[Q_{IN}, I_{IN}] \times LO_Q \times \frac{(2Q_{IN} - 2^N)}{2^N} + g_{m,I,error}[I_{IN}, Q_{IN}] \times LO_I \times \frac{(2I_{IN} - 2^N)}{2^N}$$

The correction current 275 is that is added to the output of the core modulator 150 at summer 216 to cancel out the current error in current output 272 is equal to $$I_{CORRECTION}[Q_{IN},I_{IN}]=-I_{OUT,error}[Q_{IN},I_{IN}]$$

In some embodiments, the $$\frac{(2Q_{IN} - 2^N)}{2^N}$$

function in the equations above may be considered inherent to the corresponding mixing-DAC. For example, in some embodiments, if the input is at max (N), the output current is at the maximum positive value. In some embodiments, if the input is at minimum (0), the output current is at the maximum negative value.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
a digital processor; and
a self-correction in-phase and quadrature (I/O) modulator coupled to the digital processor, the self-correction I/O modulator configured to generate correction data based on digital in-phase and quadrature signals received from the digital processor, and generate a calibrated modulated signal based on the correction data, the self-correction I/O modulator includes:
a first multiplexer (MUX) having a first input, a second input, and a control input, a first most significant bit (MSB) of the in-phase signal is provided to the first input, an inverted version of the first MSB of the in-phase signal is provided to the second input, and a first MSB of the quadrature signal is provided as a first control signal to the control input.

2. The apparatus of claim 1, wherein:
the self-correction I/O modulator includes a core modulator and a calibration correction unit, wherein the calibration correction unit is configured to correct an output of the core modulator based upon the correction data.

3. The apparatus of claim 2, wherein:
the calibration correction unit includes a calibration processing unit and a calibration modulation unit, the calibration processing unit configured to utilized the correction data to program the calibration modulation unit to generate a correction current or a correction transconductance.

4. The apparatus of claim 3, wherein:
the calibration processing unit includes a digital calibration processing unit, the digital calibration processing unit used to generate subset content that is used to program a first calibration multiplexing unit.

5. The apparatus of claim 3, wherein:
the calibration processing unit includes a first calibration multiplexing processing unit configured to receive subset content from the digital processor to program the first calibration processing multiplexing unit.

6. The apparatus of claim 5, wherein:
the correction data is generated by the first calibration multiplexing processing unit by accessing a first portion of the in-phase signal.

7. The apparatus of claim 6, wherein:
the correction data is generated by the first calibration multiplexing processing unit by accessing a first portion of the quadrature signal.

8. The apparatus of claim 7, wherein:
the first portion of the in-phase signal is characterized as the first MSB of the in-phase signal and the first portion of the quadrature signal is characterized as the first MSB of the quadrature signal.

9. The apparatus of claim 1, wherein:
the first control signal controls whether the first MSB of the in-phase signal or the inverted version of the first MSB of the in-phase signal is provided at the output of the first MUX.

10. The apparatus of claim 9, wherein:

the output of the first MUX is provided as a second control input signal to a control input of a second MUX, the second control input signal controlling whether the first MSB of the in-phase signal and the inverted version of the first MSB of the in-phase signal are provided to the calibration modulation unit to generate the correction current that is provided at the output of the calibration correction unit to correct the output of the core modulator.

11. The apparatus of claim 10, wherein:

the calibration processing unit includes a second calibration multiplexing processing unit, the second calibration multiplexing processing unit used to adjust an amount of correction current provided at the output of the calibration correction unit to correct the output of the core modulator.

12. The apparatus of claim 11, wherein:

the second calibration multiplexing processing unit includes a first MUX, a second MUX, a binary decoder, and a plurality of transistors, the first MUX, second MUX, binary decoder used to generate input to the plurality of transistors that adjusts the amount of correction current provided at the output of the calibration correction unit to correct the output of the core modulator.

13. A method, comprising:

receiving digital in-phase and quadrature signals from a digital processor at inputs of a self-correction modulator;

generating correction quantities based upon the digital in-phase and quadrature signals, wherein generating correction quantities includes;

receiving a first most significant bit (MSB) of the in-phase signal at a first input of a multiplexer (MUX), receiving an inverted version of the first MSB of the in-phase signal at a second input of the MUX, and receiving a first MSB of the quadrature signal at a control input of the MUX to control the MUX; and using the correction quantities to generate a calibrated modulated signal at an output of the self-correction modulator.

14. The method of claim 13, further comprising:

ascertaining a first subset of digital in-phase and quadrature signals that are mapped to the correction quantities;

using the first subset of digital in-phase and quadrature signals to generate the correction quantities.

15. The method of claim 13, further comprising:

generating a correct current based on the correction quantities.

16. A modulator, comprising:

a core modulator coupled to receive a digital in-phase signal and a digital quadrature signal; and a calibration correction unit coupled to the core modulator, wherein based upon a calibration correction assessment of the in-phase signal and the quadrature signal by the calibration correction unit, the calibration correction unit generates a first output that is combined with an output of the core modulator to generate a calibrated modulated output signal, the calibration correction unit includes:

a multiplexer (MUX) having a first input, a second input, and a control input, a first most significant bit (MSB) of the in-phase signal is provided to the first input, an inverted version of the first MSB of the in-phase signal is provided to the second input, and a first MSB of the quadrature signal is provided as a first control signal to the control input.

17. The modulator of claim 16, wherein:

the calibration correction unit includes a calibration processing unit and a calibration modulator, wherein the calibration processing unit uses a digital calibration processing unit, a first calibration multiplexing processing unit, and a second calibration multiplexing processing unit to produce input signals that are provided to the calibration modulator to generate the calibrated modulated output signal.

18. The modulator of claim 17, wherein:

during the calibration correction assessment, a subset of the quadrature signal and a subset of the in-phase signal are used to generate correction data that is used to generate the calibrated modulated output signal.

19. The modulator of claim 18, comprising:

the calibrated modulated output signal is generated by adding the output of the core modulator and the output the calibration correction unit that was generated using the calibration correction assessment.

* * * * *